United States Patent
Sadek et al.

(10) Patent No.: US 8,290,503 B2
(45) Date of Patent: Oct. 16, 2012

(54) MULTICHANNEL DYNAMIC FREQUENCY SELECTION

(75) Inventors: Ahmed K. Sadek, San Diego, CA (US); Alexei Gorokhov, San Diego, CA (US); Stephen J. Shellhammer, Ramona, CA (US)

(73) Assignee: QUALCOMM Incorporated, San Diego, CA (US)

(*) Notice: Subject to any disclaimer, the term of this patent is extended or adjusted under 35 U.S.C. 154(b) by 197 days.

(21) Appl. No.: 12/695,314

(22) Filed: Jan. 28, 2010

(65) Prior Publication Data

US 2010/0197317 A1 Aug. 5, 2010

Related U.S. Application Data

(60) Provisional application No. 61/148,978, filed on Feb. 1, 2009.

(51) Int. Cl.
*H04W 72/00* (2009.01)
(52) U.S. Cl. ............... 455/452.1; 455/450; 455/451; 455/464; 455/509
(58) Field of Classification Search ............... 455/452.1, 455/436–453, 463–465, 41.1–41.2, 509
See application file for complete search history.

(56) References Cited

U.S. PATENT DOCUMENTS

| | | | | |
|---|---|---|---|---|
| 6,256,500 | B1* | 7/2001 | Yamashita | 455/441 |
| 7,706,841 | B2* | 4/2010 | Jeong et al. | 455/562.1 |
| 2002/0061031 | A1* | 5/2002 | Sugar et al. | 370/466 |
| 2005/0143123 | A1* | 6/2005 | Black et al. | 455/552.1 |
| 2006/0023656 | A1* | 2/2006 | Anglin | 370/328 |
| 2007/0026868 | A1* | 2/2007 | Schulz et al. | 455/454 |
| 2007/0099670 | A1* | 5/2007 | Naguib et al. | 455/562.1 |
| 2009/0268674 | A1 | 10/2009 | Liu et al. | |
| 2010/0304772 | A1* | 12/2010 | Wang et al. | 455/509 |

FOREIGN PATENT DOCUMENTS
WO WO2007043827 A1 4/2007

OTHER PUBLICATIONS

International Search Report and Written Opinion—PCT/US2010/022704, International Search Authority—European Patent Office—Jul. 27, 2010.
Marcel William Rocha Da Silva et al., "A Dynamic Channel Allocation Mechanism for IEEE 802.11 Networks, XP002591462," VI International Telecommunications Symposium, 2006, 403-408.

(Continued)

*Primary Examiner* — Jinsong Hu
*Assistant Examiner* — Michael Nguyen
(74) *Attorney, Agent, or Firm* — Jeffrey D. Jacobs

(57) ABSTRACT

Multichannel dynamic frequency selection in wireless networks begins with an access point for a wireless network broadcasting a list of unused channels that are available for communication within the area served by the access point. The various access terminals within this service area receive the broadcast and measure various interference characteristics of each of the channels in the list. The access terminals then send this interference information to the access point, which compiles a matrix of interference information that is associated with the quality of each signal as related to each access terminal. Using this information, the access point selects the appropriate channels to serve the most number of access terminals at the highest possible channel qualities.

21 Claims, 9 Drawing Sheets

OTHER PUBLICATIONS

Yuan Yuan et al., "Allocating dynamic time spectrum blocks in cognitive radio networks, XP002591463," MOBIHOC, 2007, pp. 1-10.

Li, "A Resource Scheduling Scheme Utilizing Grey Space Spectrms for OFDM Based Cognitive Radio Systems", IEEE, the 5th International Conference on Wireless Communication, Networking, and Mobile Computing (WiCOM 2009), Sep. 24-26, 2009, Beijing, China (5 pages).

Kamil, "Spectrum Sensing Opportunities in Cognitive Radios", IEEE, The 5th International Conference on Wireless Communication, Networking, and Mobile Computing (WiCOM 2009), Sep. 24-26, 2009, Beijing, China (5 pages).

Eliezer & Shoemake, "Bluetooth and Wi-Fi coexistence schemes strive to avoid chaos", RF Design (Magazine), Nov. 2001, Wireless Connectivity, (8 pages).

* cited by examiner

MULTICHANNEL DYNAMIC FREQUENCY SELECTION

CROSS REFERENCE TO RELATED APPLICATION

This application claims the benefit of U.S. Provisional Patent Application No. 61/148,978 filed Feb. 1, 2009, entitled, "METHOD AND APPARATUS FOR MULTI-CHANNEL DYNAMIC FREQUENCY SELECTION," the disclosure of which is expressly incorporated by reference herein in its entirety.

TECHNICAL FIELD

The present disclosure relates, in general, to channel management in wireless communication systems, and, more particularly, to multichannel dynamic frequency selection.

BACKGROUND

Wireless communication systems deliver a wide variety of communication services to mobile users via wireless connections to the telecommunications infrastructure. These wireless systems employ radio techniques to allow mobile user devices to access various base stations in a wireless communication network, often in a cellular geometry. The base stations, in turn, are connected to mobile switching centers which route connections to and from the mobile user devices to other users on different communications networks, such as the public switched telephony network (PSTN), Internet, and the like. In this manner, users that are away from fixed sites or are on the move may receive various communication services such as voice telephony, paging, messaging, email, data transfers, video, Web browsing, and the like.

In one aspect, various radio frequencies are employed for the wireless interconnections between the base station and mobile users, and in order to maintain communications between wireless users sharing the scarce radio spectrum allocated for wireless communication services a common set of protocols are used. One such important protocol relates to the access method used to connect a mobile user device or access terminal to the wireless communications network. Various access methods include frequency division multiple access (FDMA), time division multiple access (TDMA), code division multiple access (CDMA), and orthogonal frequency division multiplex (OFDM). OFDM utilizes a plurality of carriers spaced apart in the frequency domain such that data modulated on each carrier is orthogonal to the others.

BRIEF SUMMARY

Various embodiments of the present teachings are directed to multichannel dynamic frequency selection in wireless networks. An access point for a wireless network broadcasts a list of unused channels that are available for communication within the area served by the access point. The various access terminals within this service area receive the broadcast and measure various interference characteristics of each of the channels in the list. The access terminals then send this interference information to the access point, which compiles a matrix of interference information associated with the quality of each signal as related to each access terminal. Using this information, the access point selects the appropriate channels to serve the most number of access terminals at the highest possible channel qualities.

Additional representative embodiments of the present teachings are directed to methods for dynamically selecting a multiple channels in a wireless communication network. These methods include broadcasting a set of available channels into the wireless communication network, receiving interference information from multiple access terminals. This interference information describes interference for channels in the set of available channels that the access terminal can access for measurement. The methods also include selecting an operating channel for each of the access terminals based on a channel within the set of available channels that has a favorable interference measurement for that access terminal according to the interference information. The methods also include allocating the operating channel for downlink communication with each of the plurality of access terminals, wherein, in serving the plurality of access terminals, multiple operating channels are selected.

Further representative embodiments of the present teachings are directed to methods for an access terminal to determine an operating channel for downlink communication in a wireless communication network. These methods include extracting a set of available channels from a signal broadcast from an access point of the wireless communication network, measuring an interference associated with a plurality of the set of available channels at the access terminal, transmitting the measured interference for the tested available channels to the access point, and receiving an allocated channel from the access point, wherein the interference associated with the allocated channel is favorable for transmission to the access terminal.

Still further representative embodiments of the present teachings are directed to access points of a wireless communication network. These access points include a processor, a modulator/demodulator (modem) coupled to the processor, a transceiver coupled to the processor, an antenna array coupled to the transceiver, a memory coupled to the processor, and a channel selection module stored in the memory. When executed by the processor, the executing channel selection module configures the access point to broadcast a set of available channels into the wireless communication network, and to receive interference information from a plurality of access terminals. This interference information describes interference for a plurality of channels in the set of available channels. The executing channel selection module also configures the access point to select an operating channel for each of the plurality of access terminals based on an available channel of the set of available channels that has a favorable interference measurement for each of the plurality of access terminals according to the interference information, and to allocate the operating channel for downlink communication with each of the plurality of access terminals, wherein, in serving the plurality of access terminals, multiple operating channels are selected.

Further representative embodiments of the present teachings are directed to access terminals of a wireless communication network. These access terminals include a processor, a modulator/demodulator (modem) coupled to the processor, a transceiver coupled to the processor, an antenna array coupled to the transceiver, a memory coupled to the processor, and a signal quality analysis module stored in the memory. When executed by the processor, the executing signal quality analysis module configures the access terminal to extract a set of available channels from a signal broadcast from an access point, to measure an interference associated with as many of the channels in the set of available channels that the access terminal can measure, to transmit the measured interference for the measured channels to the access point, and to receive an allocated channel from the access point, wherein the interference associated with the allocated channel is favorable for transmission to the access terminal.

Further representative embodiments of the present teachings are directed to computer readable media having program code tangibly stored thereon. The program code includes code to broadcast a set of available channels into a wireless communication network, and code to receive interference information from a plurality of access terminals. This interference information describes interference for a plurality of channels in the set of available channels. The program code further includes code to select an operating channel for each of the access terminals based on an available channel that has a favorable interference measurement for the particular access terminal according to the interference information, and code to allocate the operating channel for downlink communication with the each of the plurality of access terminals, wherein, in serving the plurality of access terminals, multiple operating channels are selected.

Further representative embodiments of the present teachings are directed to computer readable media having program code tangibly stored thereon. This program code includes code to extract a set of available channels from a signal broadcast from an access point, code to measure an interference associated with a as many channels of the set of available channels that the access terminal can measure, code to transmit the measured interference for these measured channels to the access point, and code to receive an allocated channel from the access point, wherein the interference associated with the allocated channel is favorable for transmission to the access terminal.

Additional representative embodiments of the present teachings are directed to systems for dynamically selecting a plurality of channels in a wireless communication network. Such systems include means for broadcasting a set of available channels into the wireless communication network, and means for receiving interference information from a plurality of access terminals. This interference information describes interference for a plurality of channels in the set of available channels. The systems further include means for selecting an operating channel for each of the access terminals based on an available channel that has a favorable interference measurement for that particular access terminal according to the interference information, and means for allocating the operating channel for downlink communication with the access terminals, wherein, in serving the plurality of access terminals, multiple operating channels are selected.

Additional representative embodiments of the present teachings are directed to systems for an access terminal to determine an operating channel for downlink communication in a wireless communication network. These systems include means for extracting a set of available channels from a signal broadcast from an access point of the wireless communication network, means for measuring an interference associated with as many channels of the set of available channels that can be measured by the access terminals, means for transmitting the measured interference for the measured channels to the access point, and means for receiving an allocated channel from the access point, wherein the interference associated with the allocated channel is favorable for transmission to the access terminal.

The foregoing has outlined rather broadly the features and technical advantages of the present teachings in order that the detailed description that follows may be better understood. Additional features and advantages will be described hereinafter which form the subject of the claims. It should be appreciated by those skilled in the art that the conception and specific embodiments disclosed may be readily utilized as a basis for modifying or designing other structures for carrying out the same purposes of the present teachings. It should also be realized by those skilled in the art that such equivalent constructions do not depart from the technology of the teachings as set forth in the appended claims. The novel features which are believed to be characteristic of the teachings, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present teachings.

BRIEF DESCRIPTION OF THE DRAWINGS

For a more complete understanding of the present teachings, reference is now made to the following description taken in conjunction with the accompanying drawings.

DETAILED DESCRIPTION

Figure 1:
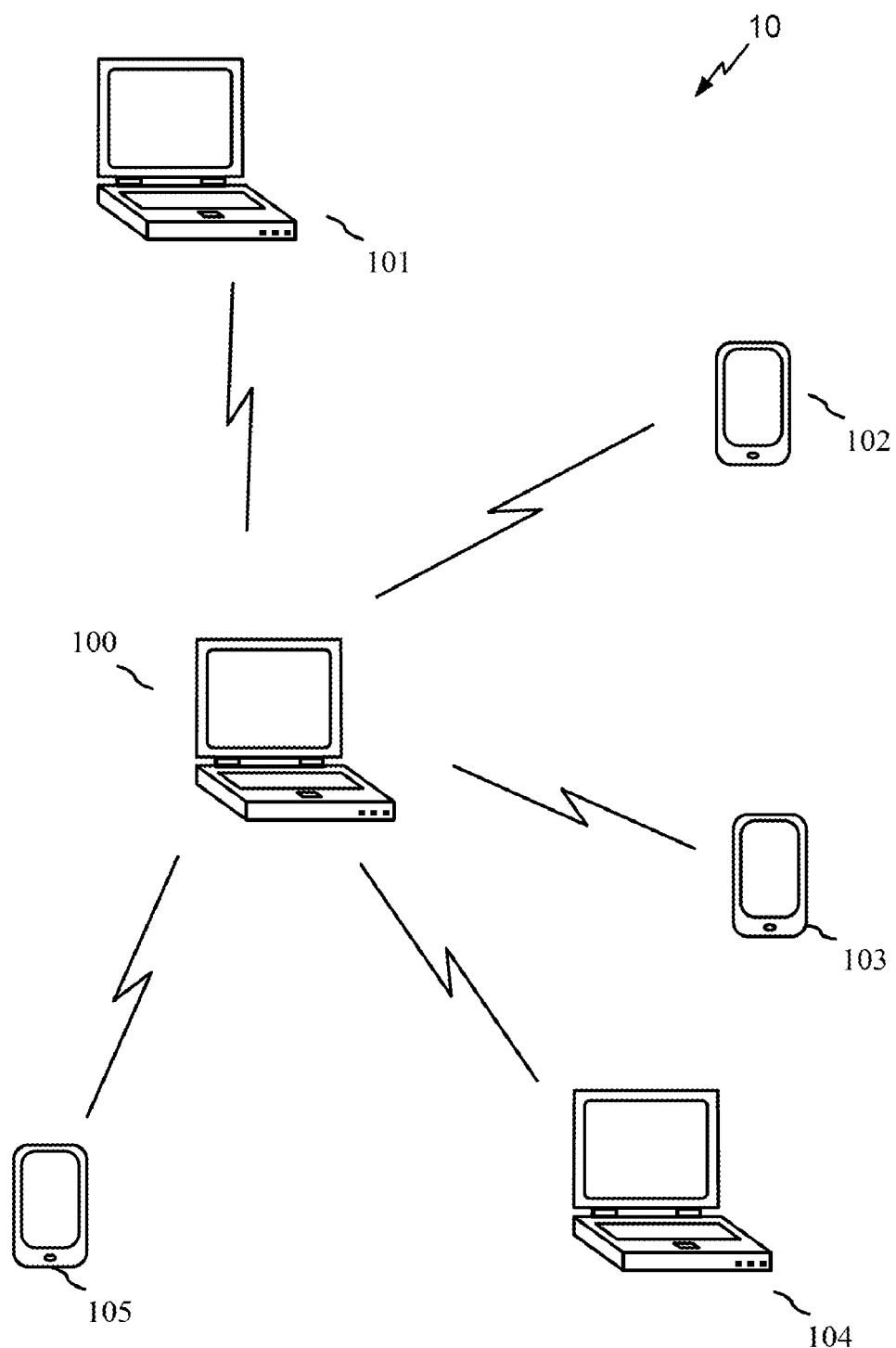
FIG. 1 is a block diagram illustrating a white space communication network configured according to one embodiment of the present teachings.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

An important constraint which affects wireless communication users is the limited radio spectrum within the coverage area. Because the usable radio spectrum is a finite natural resource shared among divergent users and applications within a coverage area, usage of this scarce radio spectrum is regulated by governmental bodies through frequency allocations and radio regulations. In many cases, portions of the radio spectrum are licensed to authorized wireless operators in a specific frequency allocation, which complies with the terms and conditions of licenses and specified radio regulations. Historically, spectrum management has been a highly regulated activity with strict licensing requirements for accessing user devices. Scarcity of the radio spectrum has been a serious impediment to serving the increased demand for higher data rate wireless services, particularly in dense urban areas.

There is a more recent trend, however, toward sharing usage of unlicensed radio spectrum where governmental bodies allow for unlicensed operation in certain radio frequency bands, subject to certain restrictions and tighter radio regulations. The growth of unlicensed shared radio operation by spectrum sharing is viewed as a more efficient utilization of the scarce spectral resource by allowing more reuse over time, frequency, or spatial dimensions. This frequency reuse results in greatly improved spectral efficiency. Coordination of spectrum sharing among user devices is easier if they all conform to the same air interface; that is, if they are homogeneous. However if heterogeneous wireless systems, which use different or incompatible air interfaces, share the same radio frequency bands, then spectrum coordination becomes more difficult. In fact, management of the mutual interference using a common control channel may not even be feasible.

The Federal Communication Commission (FCC) and companies from the wireless industry have conducted measurements that show infrequent utilization of the wireless spectrum at any given time or location. This is especially true for the television (TV) band, where a high percentage of the spectrum is underutilized. This underutilized TV band spectrum is referred to as white space. To address this underutilization of scarce wireless spectrum, the FCC issued a report and order permitting unlicensed cognitive access in the TV white space spectrum. These new regulatory rules open up an opportunity to develop new wireless networks to utilize this spectrum.

Given the unlicensed nature of operation in white space, interference between the wireless networks sharing the spectrum can render the operation of these networks highly unreliable. The problem becomes more acute when different or incompatible types of networks are sharing this spectrum. These heterogeneous networks may have different air-interfaces, different physical layer (PHY), different medium access control (MAC) layer, different operating parameters, and the like. Therefore, interference management protocols are used to enable reliable operation of the various systems sharing the same spectrum.

One interference management protocol currently in use is dynamic frequency selection (DFS). DFS was originally proposed for use in the IEEE 802.11h wireless standard as a way of protecting primary spectrum users (which, in the IEEE 802.11h spectrum, are radars) and achieving uniform utilization of the available channels, thus, reducing interference. IEEE 802.11 is a set of standards implementing wireless local area network (WLAN) computer communication in the 2.4, 3.6 and 5 GHz spectrum bands. These standards are maintained by the Institute of Electrical and Electronics Engineers (IEEE) LAN/MAN Standards Committee (IEEE 802).

In operation of dynamic frequency selection, an access point selects a single operating channel based on the supported channel list provided by the client access terminals and its own channel interference measurements. In one example, dynamic frequency selection is implemented for IEEE 802.11h networks in which each access point measures the available channels and selects the channel with the minimum measured interference. The various wireless networks in the set of IEEE 802.11 standards are time division duplexing (TDD) systems. TDD systems provide for communication between access points and their client access terminals using the same channel. Therefore, channel selection in dynamic frequency selection is limited by the receiver that experiences the maximum interference. Moreover, in an infrastructure-based deployment, the channel selection is based on the interference measurements at the access point.

It should be noted that, for purposes of this application, access point is a general term used to describe any variety of access nodes providing users access to a network. An access point may also be called a base station, node B, E node B, and the like. Similarly, an access terminal is a general term used to describe any variety of devices that a user will operate to access a network. An access terminal may also be called a user equipment, mobile device, module unit, wireless device, and the like.

In contrast to the single channel communication of the TDD IEEE 802.11 networks, many other communication network protocols, such as cdma2000, universal mobile telecommunications system (UMTS)/wideband code division multiple access (WCDMA) Frequency Division Duplexing mode, and the like, operate a frequency division duplexing (FDD) system. In an FDD system, the uplink and downlink transmissions operate on separate channels. Because separate channels are used, channel selection becomes dependent on the interference observed at the client access terminals. Moreover, in point-to-multipoint FDD or TDD systems, such as a wide area network (WAN), a micro-cellular network, a hotspot, or the like, client access terminals will observe different interference patterns from one location to another, which makes the channel selection problem even more challenging. Therefore, the current dynamic frequency selection interference management protocol would be inefficient, if applied to FDD wireless communication networks or point-to-multipoint systems in general.

FIG. 1 is a block diagram illustrating a white space communication network 10 configured according to one embodiment of the present teachings. The white space communication network 10 provides wireless communication in the TV band of the radio frequency (RF) spectrum. It is configured with a laptop computer acting as an access point, access point 100, for unlicensed client access terminals, access terminals 101-105. In order to manage this unlicensed communication network, the white space communication network 10 uses a multichannel dynamic frequency selection (M-DFS) protocol to solve the channel selection problems inherent in unlicensed networks. Instead of the access point 100 selecting only a single channel for communication with the access terminals 101-105, multiple channels are selected according to an analysis that provides high quality channel access to the access terminals 101-105 over a subset of available channels.

Networks operating in the TV band, such as the white space communication network 10, function according to rules that are intended to protect the licensed primary users of the spectrum, i.e., TV broadcast providers, certain wireless microphone users, and the like. These licensed primary users transmit signals using a specific set of standards referred to in North America as the Advanced Television Systems Committee (ATSC) standards and the National Advanced Television Systems Committee (NTSC) standards. The rules also protect the wireless transmissions from certain types of wireless microphones. For purposes of this application, the signals protected by these regulations will be referred to collectively as ATSC signals or other such ATSC transmissions. When implementing and conducting communications in the TV band white space, regulations prohibit unlicensed signals from causing interference with the licensed ATSC signals from the primary users. Therefore, any of the communications transmitted between the access point 100 and the access terminals 101-105 may not occupy channels that already carry licensed ATSC signals.

In operation, the access point 100 analyzes the available channels to determine which channels are unused and which channels are currently occupied by a licensed ATSC signal. A set of available channels is created which the access point 100 then broadcasts into the white space communication network 10. As each of the access terminals 101-104 receives the transmission from the access point 100 that includes the set of available channels, each one of the access terminals begins to measure the quality and interference characteristics for each channel in the set. Various signal measurements may be used depending on the particular embodiment of the present teachings implemented including signal-to-noise ratio (SNR), signal-to-interference-plus-noise ratio (SINR), carrier-to-interference ratio (CIR), and the like.

As each of the access terminals 101-104 finish compiling the interference information for each of the measured channels in the set of available channels, the access terminals 101-104 transmit this interference information to the access point 100. It should be noted that the access terminals 101-104 transmit the interference information for each of the measured channels to the access point 100 and not merely an identification of the single channel with the best interference information for that particular access terminal. The access point 100 receives all of the interference information and is, therefore, able to compile a matrix of interference characteristics for each of the access terminals 101-104 being served in the white space communication network 10.

Using this matrix of interference information, the access point may group the access terminals 101-104 into several groups and select the particular channel that will provide a high quality or the highest quality signal to each of the access terminals in the group. For example, assuming, for purposes of the described embodiment, that the set of available channels is channels 1, 3-5, 7, 9, and 10. When the access point 100 receives the interference information from the access terminals 101-104, the access point 100 will recognize that access terminal 101 is only capable of receiving signals using channel 1 because localized interference or hardware limitations either completely rule out or provide an unacceptable level of interference in channels 3-5, 7, 9, and 10. The access point 100 also recognizes that the access terminal 102 measures the best interference characteristics for channel 5, good channel interference characteristics for channels 3 and 9, and unacceptable interference for the remaining channels in the set. The access terminal 103 measures the best interference characteristics for channel 10, good channel interference characteristics for channels 7, 1, and 4, and unacceptable interference for the remaining channels. The access terminal 104 measures its best interference characteristics for channels 3 and 1, while all of the remaining channels in the set have unacceptable interference.

In executing the multichannel dynamic frequency selection, the access point 100 analyzes the matrix of interference information attempting to select the best available channels to serve the most access terminals at the highest possible signal quality for each served access terminal. The analysis results in the access point 100 selecting to allocate channel 1 to serve the access terminal 101, channel 3 to serve the access terminals 102 and 104, and channel 10 to serve the access terminal 103. In making its selections, the access point 100 attempts to use the least number of channels while serving the most possible access terminals at a signal quality that is high for each particular access terminal. The allocation of channel 3 to serve the access terminals 102 and 104 reflects the channel conservation consideration be finding a common channel with either the best or good interference conditions for both of the access terminals 102 and 104. Additionally, when no single channel can be found to serve all of the access terminals 101-104, the access point 100 is capable of selecting multiple channels for communication within the white space network 10, thus, not only increasing the network throughput, but increasing the reliability of the communication by "customizing" the channel selection for each individual client access terminal according to channel quality measurements taken by those client access terminals. The access point 100 will then notify the access terminals 101-104 of the channel allocations, after which the access point 100 will use the selected channels for communication with terminals 101-104.

As communication continues within the white space network 10, the access terminal 105 starts up and begins searching for an access point. At this moment in communication, the access point 100 is operating the downlink on channels 1, 3, and 10. The access terminal 105 cannot operate on channel 10 because of hardware limitations and has unacceptable levels of interference on channels 1 and 3. Thus, on start up, without any additional information, the access terminal 105 would not even be able to detect the presence of the access point 100. However, in the embodiment illustrated, the access point 100 transmits a low rate beacon signal on several of its available channels, including channel 1. The beacon signal is such that, even though the access terminal 105 has substantial interference on channel 1, it can barely detect the beacon signal originating with the access point 100. From this beacon signal, the access terminal 105 is able to determine an uplink channel for the access point 100 and transmits on the uplink a request to access the white space communication network 10, but also with the information that it is incapable of receiving downlink communication on any of channels 1 and 3, because of interference, and channel 10 because of hardware limitations. The access terminal 105 is, therefore, bootstrapped into the white space communication network 10 using this beacon signal.

It should be noted that the interference measurements performed by the access terminals in the various embodiments of the present teachings are influenced by the transmission power level of the associated access points. Moreover, an access point may not necessarily be transmitting at a maximum power on every channel all the time. Many access points may only allocate a nominal transmission power to certain channels or to certain channels at particular times of the day. Thus, in the scenario described above, where the access terminal 105 reports unacceptable interference levels on channels 1 and 3. Instead of completely disregarding channels 1 and 3 during the channel selection analysis, the access point 100 may, instead, adjust its transmission power to a higher level. For example, if the access point 100 notes that it is transmitting at nominal power on channel 1 and maximum power on channel 3, it determines to increase its transmission power on channel 1. This increase in transmission power to channel 1 may, in fact, boost the interference measurements with respect to the access terminal 105 to an acceptable level, thus, providing the access point 100 with greater flexibility in allocating a good channel to the access terminal 105. Likewise, the access point 100 may reduce the transmission power on channel 3. If the interference on channel 3 as measured by the access terminal 105 were due to the transmission power of the access point 100, reduction of the power would also make channel 3 potentially available to the access terminal 105.

Figure 2:
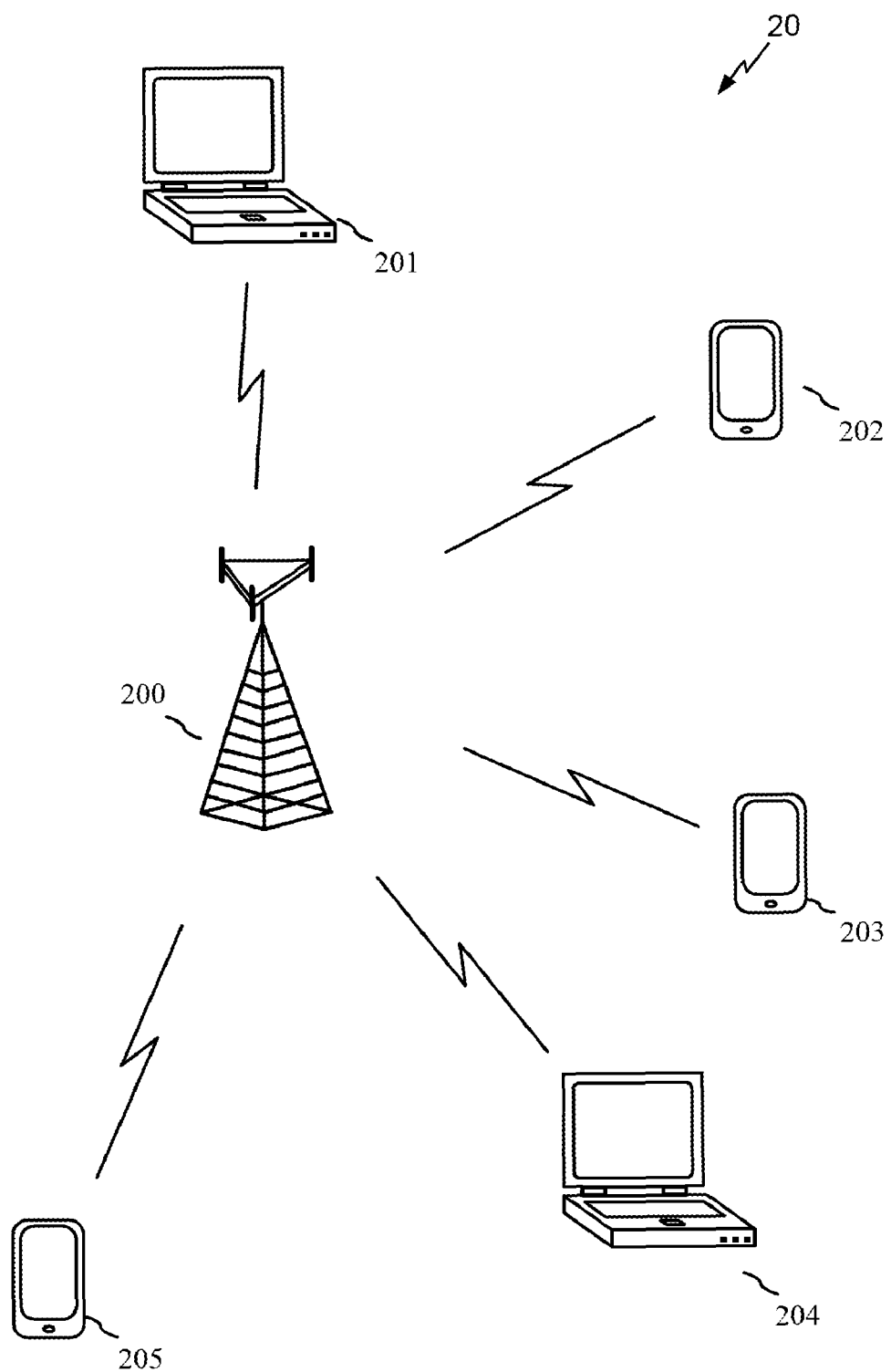
FIG. 2 is a block diagram illustrating a cellular communication network configured according to one embodiment of the present teachings.

It should further be noted that the network configurations that are compatible with the multichannel dynamic frequency selection interference management protocol are not limited to unlicensed spectrum networks. The multichannel dynamic frequency selection protocol may also be applied in combination networks where the network is capable of accessing both licensed and unlicensed spectrum. FIG. 2 is a block diagram illustrating a cellular communication network 20 configured according to one embodiment of the present teachings. The cellular communication network 20 provides communications generally over channels in a licensed spectrum of RF frequencies. However, both the network equipment and compatible accessing devices are capable of providing this communication over channels in unlicensed white space as well. A base station 200 provides communication services in a cell area of the cellular communication network 20. It should be noted that, for the sake of clarity, only a single base station is illustrated in FIG. 2. In practice, the cellular communication network 20 may have various numbers of base stations that service cells covering the entire access area of the network.

The base station 200 services a number of mobile devices within its cell, mobile devices 201-204. For any number of various reasons, communication is being established using channels in an accessible unlicensed spectrum to the mobile devices 101-104. As in the example of the white space communication network 10 (FIG. 1), the base station 200 obtains a list of unused channels within its service area. This list may be obtained by testing the available spectrum or also by accessing geo-location information which identifies the available channels for this particular area. The base station 200 broadcasts the list of unused channels into the cellular communication network 20. However, unlike the white space communication network 10 (FIG. 1), the base station 200 broadcasts the list over its licensed channels. In the licensed channels, there should be no interference. Therefore, the communication of the information over the licensed channels virtually assures that each of the mobile devices 201-204 will receive this network information.

As each of the mobile devices 201-204 receives the list of unused channels, they begin to analyze the unused channels, measuring the interference characteristics, such as CIR, SNR, SINR, and the like, for each channel in the list. The mobile devices 201-204 transmit this interference information to the base station 200, which compiles and analyzes the interference information matrix using the multichannel dynamic frequency selection protocol to select the best channels to serve each of the mobile devices 201-204 on the downlink. Again, in the embodiment of the present teachings depicted in FIG. 2, the multichannel dynamic frequency selection protocol directs the base station 200 to select the channels that provide the highest possible signal quality to each of the served mobile devices, while maximizing the number of served mobile devices with the minimum number of channels used. The base station 200 notifies the mobile devices 201-204 of the channels allocated for the downlink and transmits to the mobile devices 201-204 using the selected channels.

As communication continues in the cellular communication network 20, a mobile device 205 starts up and begins searching for a base station to connect to. While the mobile device 205 may not be capable of communicating on the unlicensed channels currently being used by the base station 200, it will be capable of communicating over the licensed channels. Therefore, on start up, if the mobile device 205 cannot detect a base station over the unlicensed channels, it will search the licensed channels. Thus, bootstrapping the mobile device 205 into the cellular communication network 20 is completed using the accessible licensed spectrum.

Figure 3:
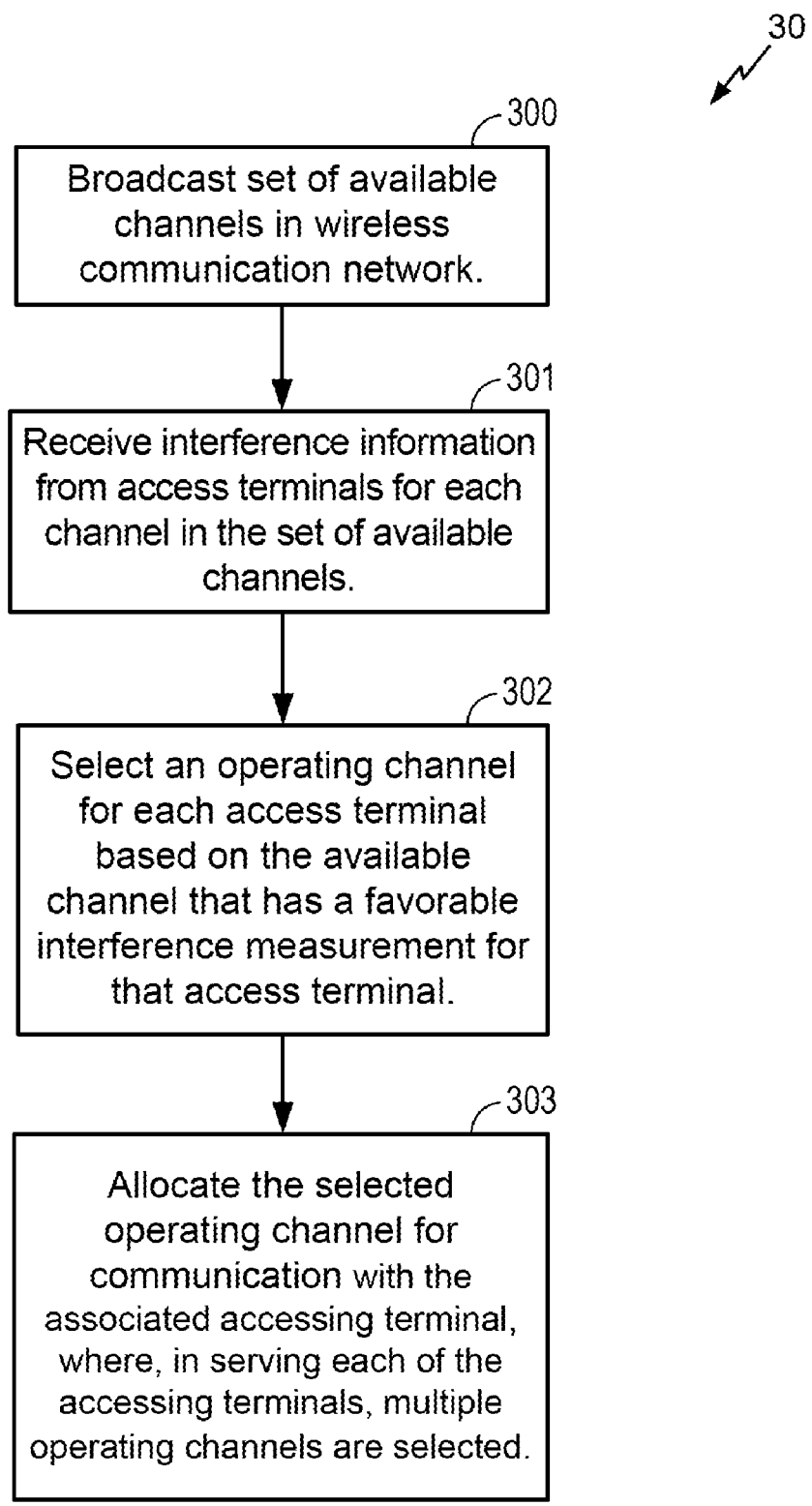
FIG. 3 is a functional block diagram illustrating the functionality of an access point configured according to one embodiment of the present teachings.

FIG. 3 is a functional block diagram 30 illustrating the functionality of an access point configured according to one embodiment of the present teachings. In block 300, a set of available channels is broadcast in the wireless communication network. Interference information is then received, in block 301, from the access terminals served by the access point, in which the interference information describes interference for each of the channels in the set of available channels. In block 302, an operating channel is selected for each access terminal based on the available channel that has a favorable interference measurement for that particular access terminal. Once selected, the operating channel is allocated for downlink communication with the associated accessing terminal, where, in serving each of the accessing terminals, multiple operating channels are selected.

Figure 4:
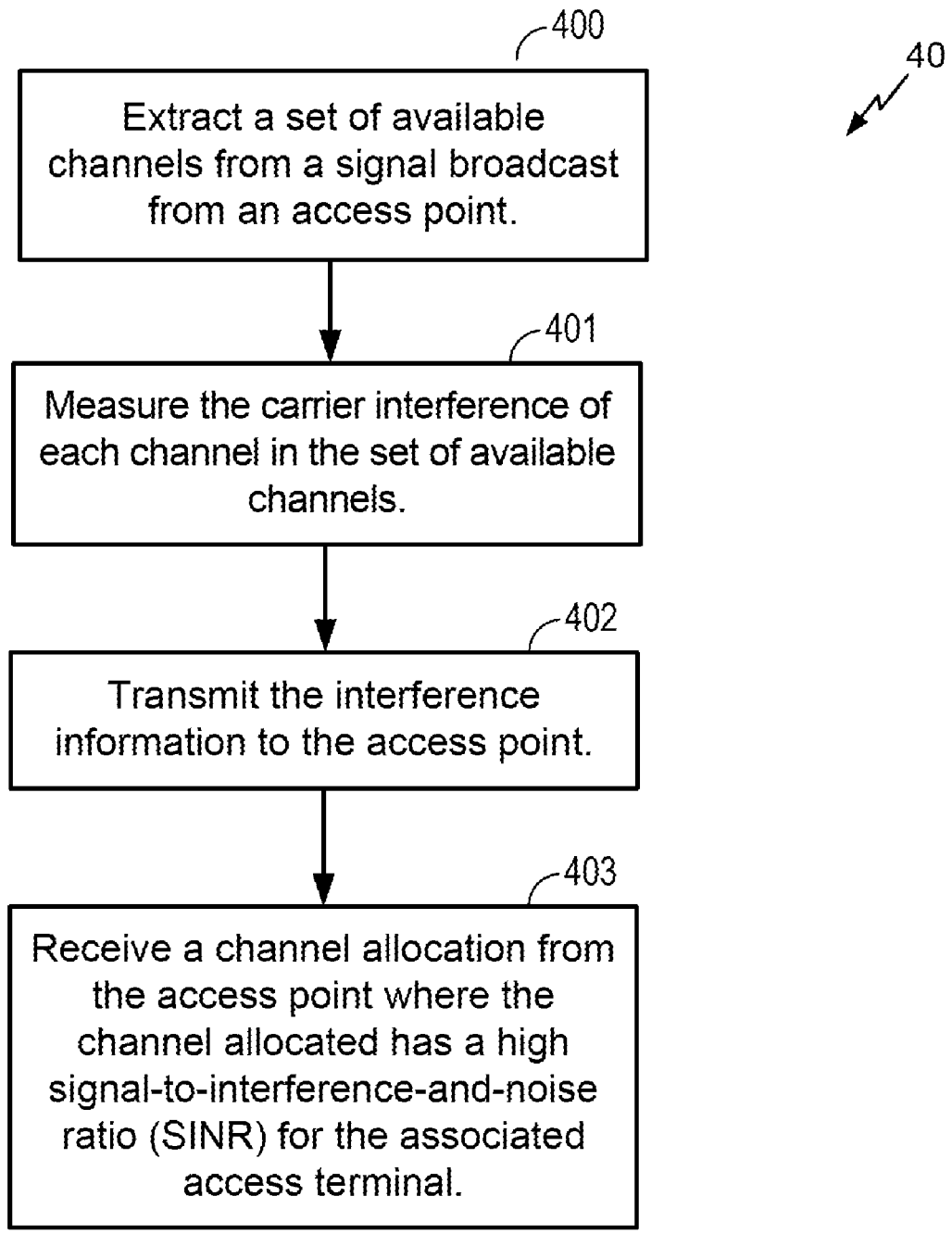
FIG. 4 is a functional block diagram illustrating the functionality of an access terminal configured according to one embodiment of the present teachings.

FIG. 4 is a functional block diagram 40 illustrating the functionality of an access terminal configured according to one embodiment of the present teachings. In block 400, a set of available channels is extracted from a signal broadcast from an access point. The carrier interference for each of the available channels in the set is measured in block 401. This interference information for each of the available channels in the set is transmitted, in block 402, to the access point. A channel allocation is then received, in block 403, from the access point, where the channel allocated has a high SINR for the associated access terminal.

Figure 5:
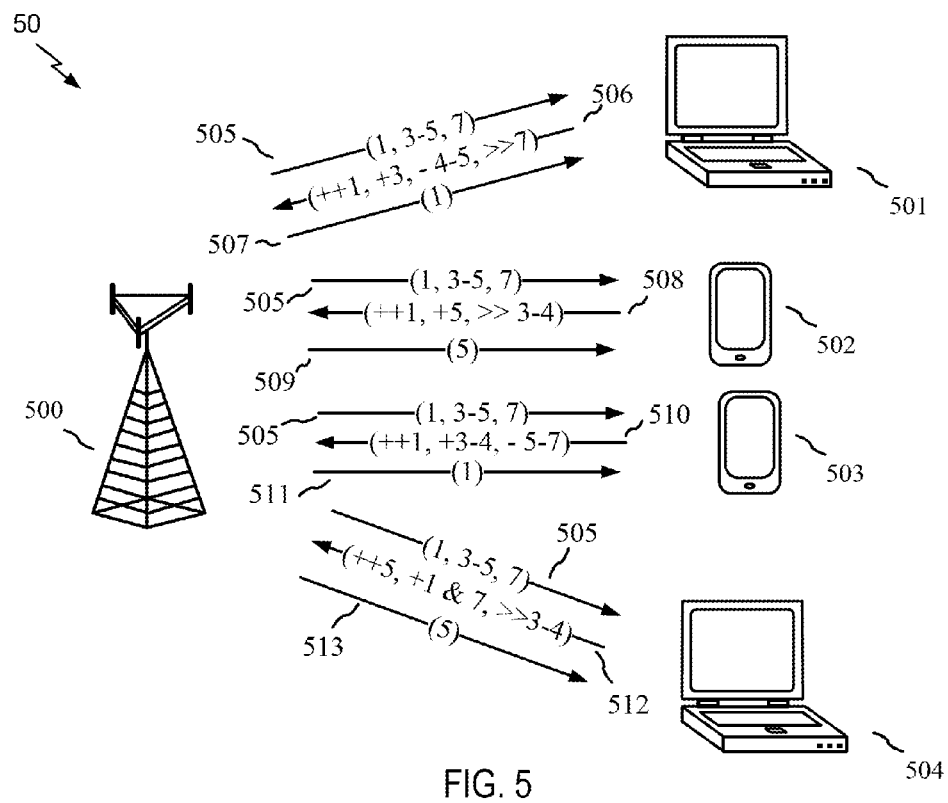
FIG. 5 is a block diagram illustrating a wireless communication network configured according to one embodiment of the present teachings.

Additional embodiments of the present disclosure may use the interference information received from the various access terminals to make selections not only based on the signal quality, but also based on overall channel loading. FIG. 5 is a block diagram illustrating a wireless communication network 50 configured according to one embodiment of the present teachings. An access point 500 provides wireless coverage to the access terminals 501-504. In beginning the channel selection process, the access point 500 broadcasts a channel information signal 505 that includes various information regarding communications within the coverage area, including a set of unused channels (1, 3-5, 7). As each of the access terminals 501-504 receives this channel information signal 505 and extracts the set of unused channels (1, 3-5, 7), the access terminals 501-504 measure the interference levels on as many of the unused channels as they can, allowing for hardware limitations and the like.

When the access terminal 501 finishes measuring the interference, it transmits an uplink signal 506 which contains the measurements for each of the unused channels. The measurements by the access terminal 501 provide that channel 1 is the best channel (++1), channel 3 is a good channel (+3), channels 4-5 are poor channels with higher interference (−4-5), and that channel 7 is unusable because its interference exceeds the threshold (>>7) set for the access terminal 501. It should be noted that the notation used in FIG. 5 is intended solely for illustrative purposes and has no formal meaning other than as described herein. The access terminal 502 transmits an uplink signal 508 which indicates that channel 1 is the best, channel 5 is good, and channels 3-4 exceed the interference threshold. Because of hardware constraints, the access terminal 502 cannot measure channel 7. Therefore, information regarding channel 7 is not a part of the measured interference information transmitted in the uplink signal 508. The access terminal 503 transmits an uplink signal 510 indicating that channel 1 is also its best measured channel, that channels 3-4 are good, and that channels 5-7 are poor. Similarly, the access terminal 504 transmits uplink signal 512 indicating that its best channel is channel 5, channels 1 and 7 are good, and channels 3-4 exceed the interference threshold for the access terminal 504.

After receiving all of the measurement information from the access terminal 501-504, the access point 500 compiles a channel interference matrix that associates the various channel interference data with the particular access terminal that provided the measurement. The access point 500 analyzes the channel interference matrix to provide an efficient distribution of access terminals within its spectrum. If the access point 500 were to simply group the access terminals 501-504 according to their best interference measurements, then it would group access terminals 501-503 onto channel 1, while access terminal 504 would be allocated channel 5 by itself. While this grouping may provide reliable communication, grouping three of the access terminals onto a single channel may cause an overloading of channel 1. Thus, while the noise and interference level of channel 1 may be the best for the access terminals 501-503, because of the amount of data that will be transmitted over channel 1, the communication rate for the access terminals 501-503 may be diminished.

In addition to evaluating the interference information in the channel interference matrix, the access point 500 also analyzes channel loading and channel distribution. Because the access terminal 502 measures that channel 5 has a good interference level, it may be more efficient to allocate the access terminal 502 to channel 5 along with the access terminal 504. In this selection process, the number of used or allocated channels are used or allocated efficiently. Therefore, there will be less of a probability that either of the channels will have a reduction in communication rate because of overloading. The access terminal 502 still has a good interference level on channel 5, thus, its service should also be reliable.

In operation, for each of the access terminals 501-504, the access point 500 selects the first channel that has the best possible interference level for that particular access terminal. The access point 500 then determines the service loading on that particular channel. If the service loading exceeds the load threshold, then the access point 500 selects the next best channel for analysis. The load threshold is generally a predetermined service load that is associated with a particular current capacity of the access point 500. For example, when the access point 500 is servicing only a few access terminals, the service load for a particular channel may be somewhat low compared with the actual physical capacity of the channel. Thus, at a low current capacity, the load threshold may be two simultaneous access terminals serviced. While the particular channel may easily accommodate five simultaneous access terminals, at the lower current capacity, the threshold is lower in order to balance the service distribution more evenly. At another period of time, if the access point 500 is servicing many access terminals, the threshold for this same channel may be four access terminals. Therefore, at this time, the current capacity of the access point 500 will allow a channel to be allocated to an access terminal when it will be the fifth access terminal on that channel. The threshold, thus, varies with the current capacity of load of the access point.

Figure 6:
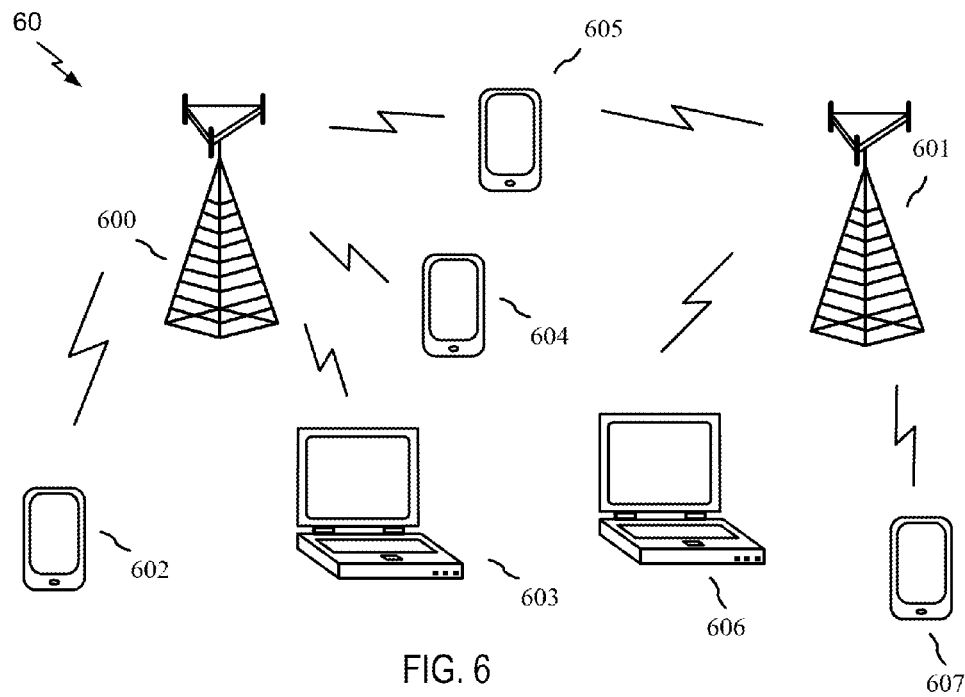
FIG. 6 is a block diagram illustrating a wireless communication network configured according to one embodiment of the present teachings.

In addition to making channel selections between multiple channels based on a channel loading metric, additional embodiments of the present teachings may consider channel loading within a multiple access point scenario. FIG. 6 is a block diagram illustrating a wireless network 60 configured according to one embodiment of the present teachings. The illustrated portion of wireless network 60 includes access points 600-601. The access point 600-601 overlap service coverage areas in certain locations. The access point 600 provides service coverage for the access terminals 602-604, and the access point 601 provides service coverage for the access terminals 606-607. The access terminal 605 is located within that area where the service coverage overlaps for the access points 600-601.

The access points 600-601 are aware of the overlapping coverage area and have been configured to cooperate in providing communication access within this overlapping area. In furtherance of this cooperation, the access points 600-601 routinely exchange information when determining channel selection for various access terminals. In the example illustrated in FIG. 6, the access terminal 605, after having measured the interference of the sets of available channels broadcast by both of the access points 600-601, transmits uplink signals including the measured interference information to both of the access points 600-601. The interference information indicates that channel 6 has the best interference level for the access terminal 605. In analyzing the interference information for selection, the access point 600 notes that the access terminals 603-604 have already been allocated to channel 6. However, through the communication with the access point 601, the access point 600 knows that there are currently no access terminals on channel 6 as served by the access point 601, and the access point 601 is not experiencing much residual interference. Residual interference is the interference provided by something other than the access points 600-601. Therefore, residual interference is generally a combination of thermal interferences and other access points.

In making the channel selection, the access point 600 takes several conditions into consideration. First, with two access terminals already connected to channel 6 within its coverage area, the access point 600 is experiencing a medium loading. Therefore, the bandwidth that would be available in connecting through the access point 600 would be less than the bandwidth available through access point 601. However, while there is low residual interference with either of the access points 600-601, should the access terminal 605 be allocated channel 6 from the access point 601, there will be more interference experienced because of the medium load on the access point 600. Thus, in such a medium load situation for the access point 600, it would be more beneficial for the access terminal 605 to connect with the lesser bandwidth but lower overall interference offered from the access point 600. In this circumstance, the access point 600 would allocate channel 6 to the access terminal 605 for uplink communication.

In a different scenario, if the access point 600 were heavily loaded, then, the higher bandwidth offered through the access point 601 would be more favorable even though there is also more interference experienced at the access point 601 from the access point 600. In this circumstance, the access point 600 would indicate for the access terminal 605 to couple to the network through the access point 601.

Figure 7:
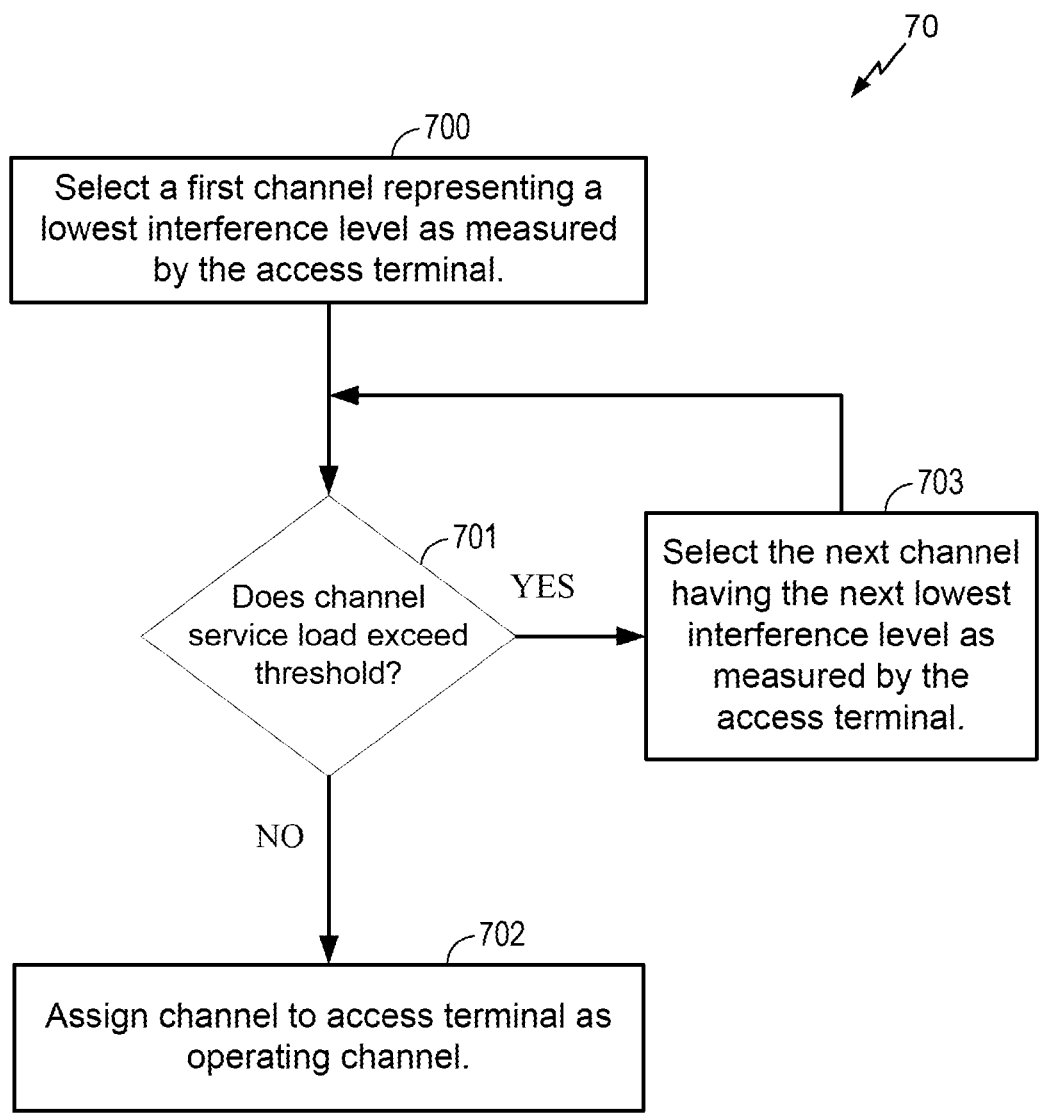
FIG. 7 is a functional block diagram illustrating example blocks executed in a wireless network configured according to one embodiment of the present teachings.

FIG. 7 is a functional block diagram illustrating example blocks executed in a wireless network configured according to one embodiment of the present teachings. As an access point begins a multichannel selection procedure that uses channel service loading as a component of the analysis, channels are considered for each access terminal from which the access point has received the measured interference information. In block 700, a first channel is selected by the access point, where the first channel represents a lowest interference level as measured by the access terminal. The access point then determines, in block 701, whether the service load on the channel exceeds a given service threshold for the current access point load. If the service load exceeds the threshold, then, in block 703, the next channel is selected that has the next lowest interference level as measured by the access terminal. The load threshold for the new channel will then be tested at block 701. If the service load does not exceed the threshold, then, in block 702, the resulting channel is assigned to access terminal as its operating channel.

It should be noted that the functional procedure described with regard to FIG. 7 is merely one example of a procedure that may be used to implement a joint interference and loading determination in a multichannel frequency selection process. Various other methods and procedures may be used within the scope of the present disclosure. For example, one embodiment may begin by analyzing the channel load or access point load. As disclosed with regard to the example in FIG. 6, multiple access points may be involved in analyzing relative loads and interference levels. The various embodiments of the present teachings are not limited to any specific means for implementing such a selection process based on both interference and loading.

Figure 8:
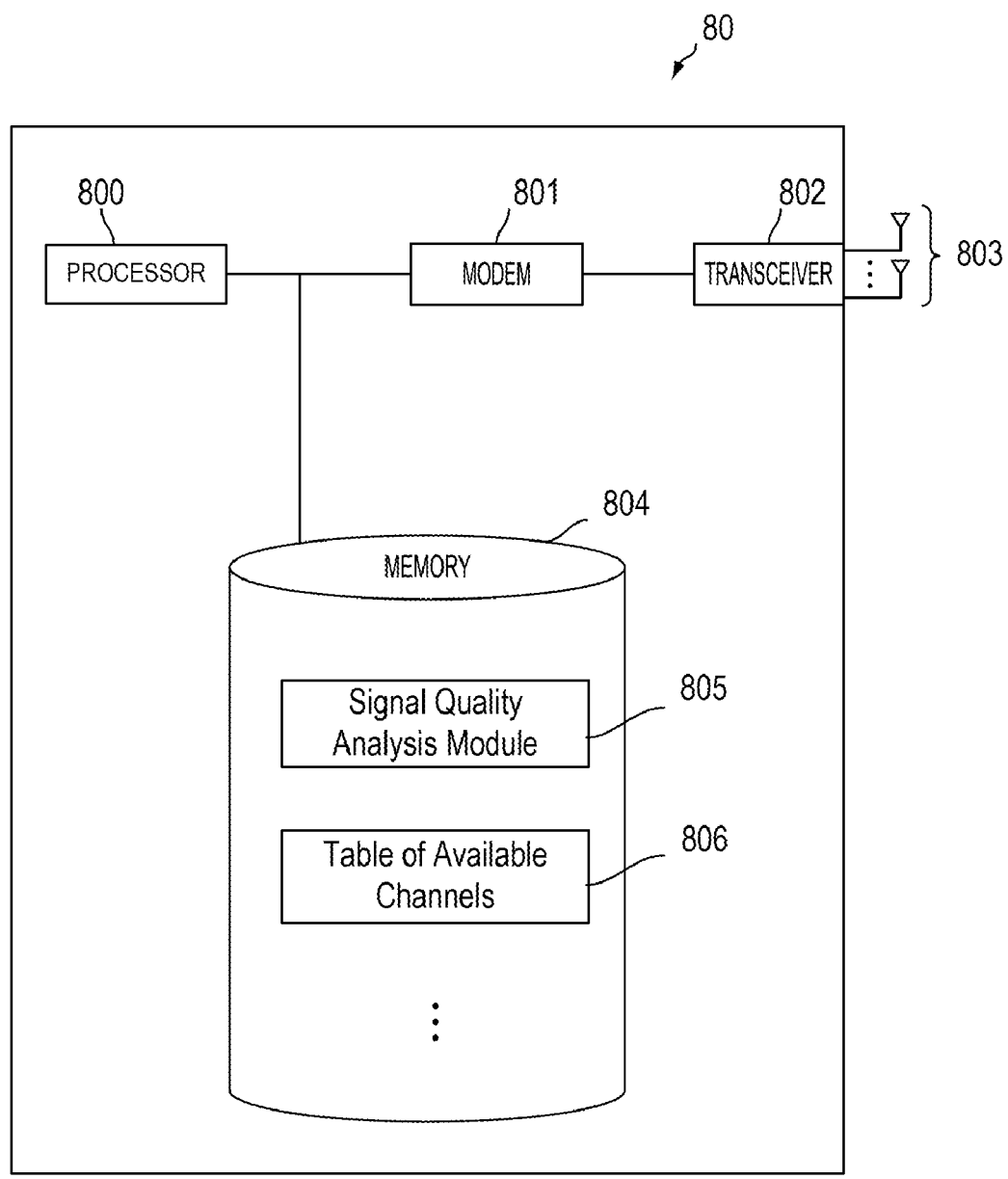
FIG. 8 is a block diagram illustrating an access terminal configured according to one embodiment of the present teachings.

In implementing the functionality of the access terminals in a network configured according to one embodiment of the present teachings, the capability to transmit all of the interference information to the access point is incorporated. FIG. 8 is a block diagram illustrating an access terminal 80 configured according to one embodiment of the present teachings. The access terminal 80 includes a processor 800 that controls and operates the overall functionality of the entire device. The access terminal 80 also includes a modulator/demodulator (modem) 801 coupled to the processor. The modem 801 modulates and demodulates the communicated signals to and from the access terminal 80. The signals are handled by a transceiver 802 also coupled to the processor 800. The transceiver 803 controls the signals being transmitted and received over an antenna array 803 to which it is coupled.

Among other components, the access terminal 80 also includes a memory 804. The memory 804 is a computer readable memory that stores various information and logic or software code modules that, when executed by the processor 800, configures the access terminal 80 to perform its various functions and capabilities. A signal quality analysis module 805 is stored on the memory 804. The signal quality analysis module 805 is executed to measure the specific interference characteristics on each of the channels in the table of available channels 804 received from an access point and stored in the memory 804. The configuration of the signal quality analysis module 805 determines which measurement or measurements are taken of the channels, e.g., CIR, SINR, SNR, and the like. The execution of the signal quality analysis module 805 also prompts the access terminal 80 to transmit the resulting interference information for each of the channels in the table of available channels 806 to the accessing terminal.

Figure 9:
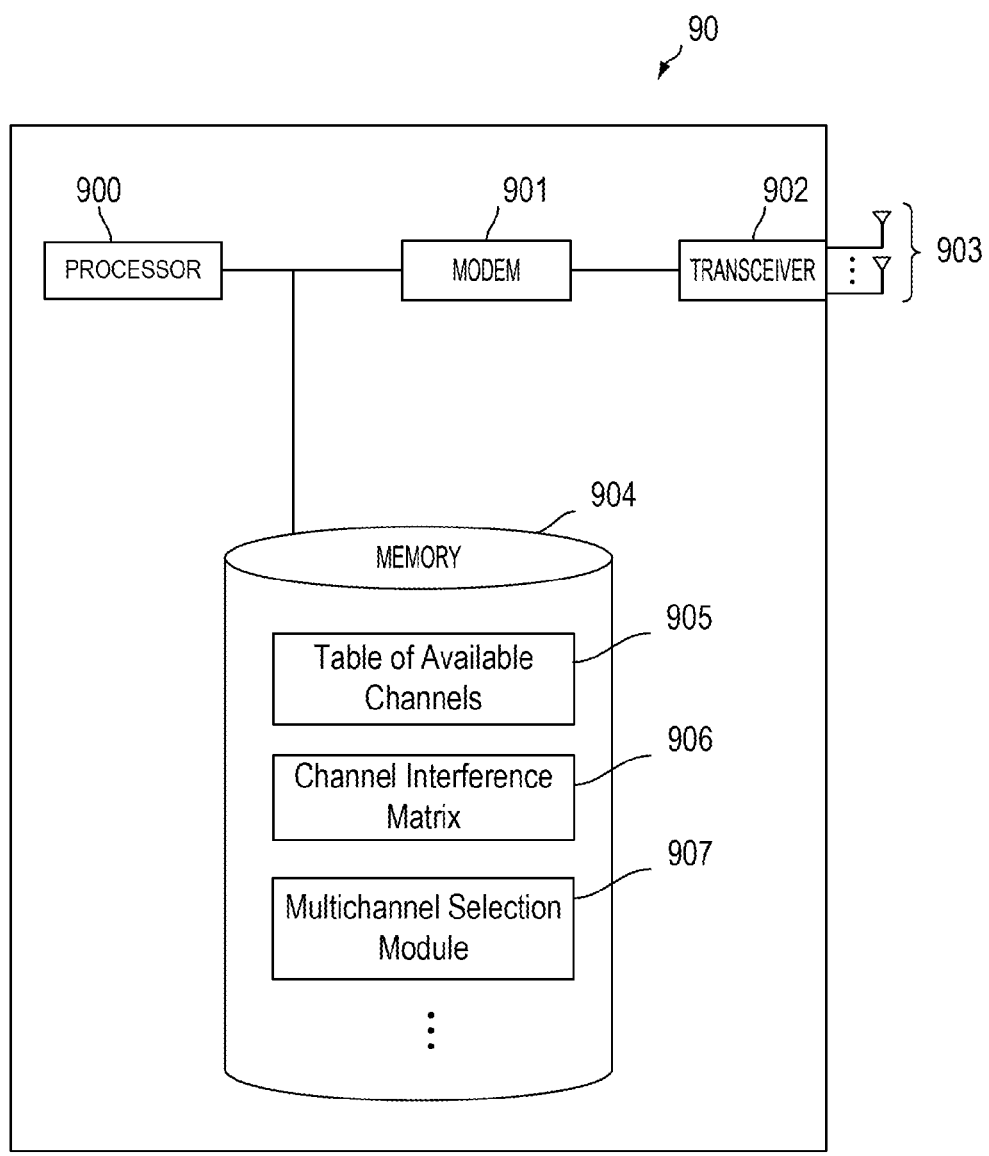
FIG. 9 is a block diagram illustrating an access point configured according to one embodiment of the present teachings.

FIG. 9 is a block diagram illustrating an access point 90 configured according to one embodiment of the present teachings. From the perspective of the access point 90, the access point 90 differs from many ordinary access points in existing wireless systems by its capability to transmit and communicate with its client access terminals using multiple channels. The access point 90 includes a processor 900, that controls and operates the overall functionality of the entire device. It also includes a modem 901 coupled to the processor 900, a transceiver 902 coupled to the processor 900, and an antenna array 903 coupled to the transceiver 902. The functional unit comprising the transceiver 902 and the antenna array 903 implement the "transmitter" capability of the access point 90, and allows the access point 90 to communicate using multiple channels.

The access point 90 also includes a memory 904 coupled to the processor 900. The memory 904 is a computer readable memory that stores various information and logic or software code modules that, when executed by the processor 900, configures the access terminal 90 to perform its various functions and capabilities. A table of available channels 905 is stored on the memory 904. The access point 90 compiles the table of available channels 905 either by specifically analyzing each of the channels that are assigned to its cell to determine which of those channels are currently available, or it may access geo-location information which maintains the list of channels allocated for a particular cell in that geographic location.

A multichannel selection module 907 is also stored on the memory 904. When executed by the processor 900, the multichannel selection module 907 configures the access point 90 to broadcast the table of available channels 905 onto the wireless network. It also uses the interference information that is thereafter received from the individual access terminals, to compile a channel interference matrix 906, which it stores in memory 904. The executing multichannel selection module 907 then uses the channel interference matrix 906 to select the particular operating channels for allocation to the access terminals based on the interference information for that particular access terminal. The multichannel selection module 907 provides for selection of multiple channels to communicate to the multiple access terminals in order to increase or maximize the number of access terminals served and increase or maximize the channel quality of service for each such served access terminal.

The configuration of the access point 90 "transmitter," as implemented by the transceiver 902/antenna array 903 functional unit, that enables the access point 90 to serve users on different channels, may be implemented in various different ways. For example, the access point 90 may have multiple transmitters within the functional unit of the transceiver 902 and the antenna array 903, in which each transmitter is dedicated to transmit on a specific channel to the set of access terminals determined by the multichannel dynamic frequency selection algorithm. This case does not incur extra complexity compared to a typical multicarrier system, for example. All access terminals may then be served simultaneously by the access point 90.

However, in cases where the maximum transmit power is defined to be the total power transmitted across all channels, it may not be desirable to transmit simultaneously across all channels because a link power budget reduction may result.

An alternative approach, in such circumstances, is to time division multiplex the transmissions for access terminals grouped in different allocated channels. For example, in a first frame, the access point transmits to all access terminals allocated to channel 1, in the second frame the access point transmits to all access terminals allocated to channel 2, and so on. The transmission time allocated to each channel, for example, may be one or more of a function of the amount of traffic requested on each channel, the number of access terminals served on each channel, or fairness criteria used by a scheduler component.

The hardware to implement this transmission time allocation approach with the transceiver 902/antenna array 903 functional unit may be implemented in various different ways. For example, the access point may have multiple transmitters implemented by the transceiver 902/antenna array 903 function unit. Each such transmitter is tuned to a separate channel. In this example configuration, because of the power considerations noted above, every transmitter will not necessarily be operational at the same time. In another example configuration, the access point may have a single transmitter implemented by the transceiver 902/antenna array 903 functional unit which is tuned to the new channel before transmission. In order to make this configuration as efficient as possible, the transmitter should be designed to have a very small tuning time. Otherwise, the delay in tuning will add to a transmission and communication latency. In another example configuration, the access point may have two transmitters implemented by the transceiver 902/antenna array 903 function unit. In such configurations, one of the transmitters is used for transmission on the current channel while the second transmitter is being tuned to transmit on the next channels, and so on. Therefore, only one of the transmitters is active and transmitting at any given time while the second transmitter is in standby or starts tuning before the first transmitter completes transmission. This implementation would avoid the need for a transmitter designed for a fast tuning time in the single transmitter approach. Moreover, this implementation would only use two transmitters irrespective of the number of channels used by the access point.

It should be noted that one of skill in the art would understand that these example configurations and implementations of the transmitter implemented by the transceiver 902/antenna array 903 function unit are not exclusive and that other examples may be used without affecting the spirit or scope of the present disclosure.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine or computer readable medium tangibly embodying instructions may be used in implementing the methodologies described herein. For example, software code may be stored in a memory and executed by a processor. When executed by the processor, the executing software code generates the operational environment that implements the various methodologies and functionalities of the different aspects of the teachings presented herein. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

The machine or computer readable medium that stores the software code defining the methodologies and functions described herein includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. As used herein, disk and/or disc includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Figure 10:
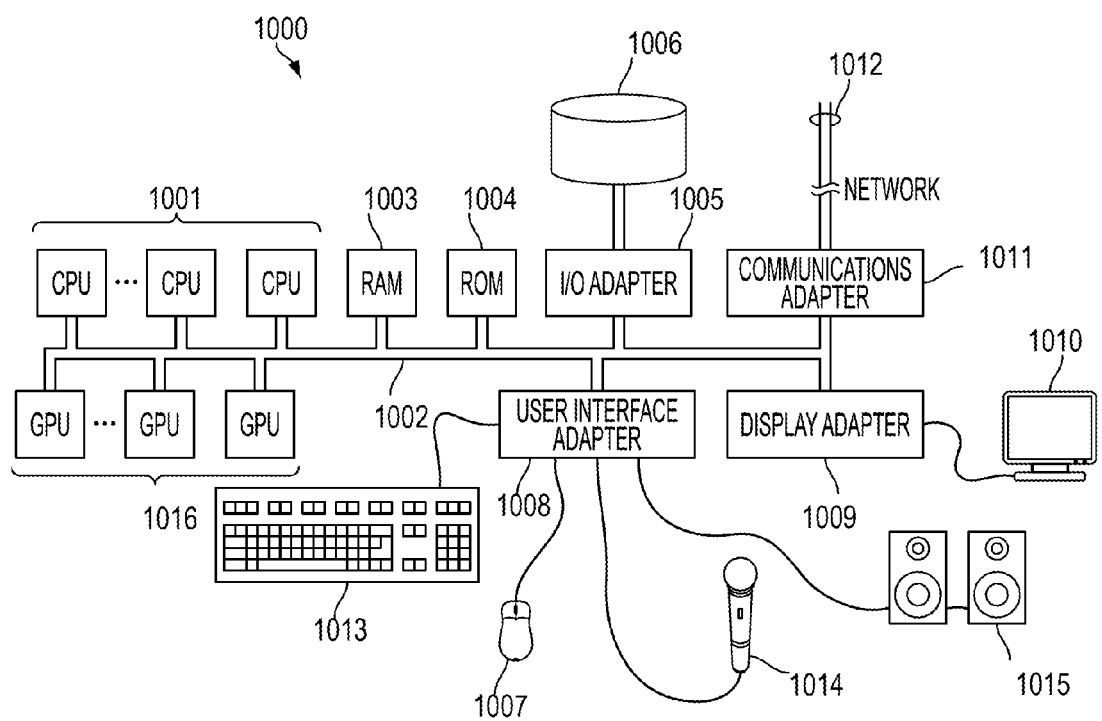
FIG. 10 illustrates an exemplary computer system which may be employed to implement any of the devices configured according to certain embodiments of the present teachings.

FIG. 10 illustrates an exemplary computer system 1000 which may be employed to implement any of the devices configured according to certain embodiments of the present teachings. A central processing unit ("CPU" or "processor") 1001 is coupled to a system bus 1002. The CPU 1001 may be any general-purpose processor. The present disclosure is not restricted by the architecture of the CPU 1001 (or other components of the exemplary computer system 1000) as long as the CPU 1001 (and other components of the exemplary computer system 1000) supports the operations as described herein. As such the CPU 1001 may provide processing to the exemplary computer system 1000 through one or more processors or processor cores. The CPU 1001 may execute the various logical instructions described herein. For example, the CPU 1001 may execute machine-level instructions according to the exemplary operational flow described above in conjunction with FIGS. 3-4 and 7. When executing instructions representative of the functionalities illustrated in FIGS. 3-4 and 7, the CPU 1001 becomes a special-purpose processor of a special purpose computing platform configured specifically to operate according to the various aspects of the teachings described herein.

The exemplary computer system 1000 also includes random access memory (RAM) 1003, which may be SRAM, DRAM, SDRAM, or the like. The exemplary computer system 1000 includes read-only memory (ROM) 1004 which may be PROM, EPROM, EEPROM, or the like. The RAM 1003 and ROM 1004 hold user and system data and programs, as is well known in the art.

The exemplary computer system 1000 also includes an input/output (I/O) adapter 1005, communications adapter 1011, user interface adapter 1008, and display adapter 1009. The I/O adapter 1005, user interface adapter 1008, and/or the communications adapter 1011 may, in certain aspects, enable a user to interact with the exemplary computer system 1000 in order to input information.

The I/O adapter 1005 couples a storage device(s) 1006, such as one or more of a hard drive, compact disc (CD) drive, floppy disk drive, tape drive, etc., to the exemplary computer system 1000. The storage devices 1006 are utilized in addition to the RAM 1003 for the memory requirements associated with performing the operations according to various aspects of the present teachings. The communications adapter 1011 is adapted to couple the exemplary computer system 1000 to a network 1012, which may enable information to be input to and/or output from the exemplary computer system 1000 via the network 1012 (e.g., the Internet or other wide-area network, a local-area network, a public or private switched telephony network, a wireless network, or any combination of the foregoing). A user interface adapter 1008 couples user input devices, such as a keyboard 1013, a pointing device 1007, and a microphone 1014 and/or output devices, such as speaker(s) 1015 to the exemplary computer system 1000. The display adapter 1009 is driven by the CPU 1001 or by a graphical processing unit (GPU) 1016 to control the display on a display device 1010, for example, to display an incoming message or call on a client mobile device. A GPU 1016 may be any various number of processors dedicated to graphics processing and, as illustrated, may be made up of one or more individual graphical processors. A GPU 1016 processes the graphical instructions and transmits those instructions to a display adapter 1009. The display adapter 1009 further transmits those instructions for transforming or manipulating the state of the various numbers of pixels used by the display device 1010 to visually present the desired information to a user. Such instructions include instructions for changing state from on to off, setting a particular color, intensity, duration, or the like. Each such instruction makes up the rendering instructions that control how and what is displayed on the display device 1010.

It shall be appreciated that the present disclosure is not limited to the architecture of the exemplary computer system 1000. For example, any suitable processor-based device may be utilized for implementing the cooperative operation of the multiradio devices, including without limitation personal computers, laptop computers, computer workstations, multi-processor servers, mobile telephones, and other such mobile devices. Moreover, certain aspects may be implemented on ASICs or very large scale integrated (VLSI) circuits. In fact, persons of ordinary skill in the art may utilize any number of suitable structures capable of executing logical operations according to the aspects.

Although the present teachings and their advantages have been described in detail, it should be understood that various changes, substitutions and alterations can be made herein without departing from the technology of the teachings as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present teachings. Accordingly, the appended claims are intended to include within their scope such processes, machines, manufacture, compositions of matter, means, methods, or steps.

What is claimed is:

1. A method for dynamically selecting a plurality of channels in a wireless communication network, said method comprising:
   broadcasting over a licensed channel in a licensed radio frequency spectrum, from an access point, a set of channels available to the access point, into said wireless communication network;
   receiving interference information from a plurality of access terminals, said interference information describing interference for at least one of the channels in said set of available channels;
   selecting an operating channel for each of said plurality of access terminals based on an available channel of said set of available channels that has a favorable interference measurement for each of said plurality of access terminals according to said interference information; and
   allocating said operating channel for downlink communication with each of said plurality of access terminals, wherein, in serving said plurality of access terminals, a plurality of operating channels in an unlicensed radio frequency spectrum are selected.

2. The method of claim 1 wherein said selecting is further based on a service load on said available channel.

3. The method of claim 1 wherein said selecting is further based on a current capacity of a plurality of access points within a shared coverage area servicing at least one of said plurality of access terminals.

4. The method of claim 1 wherein said interference information comprises at least one of:
   a signal-to-noise ratio (SNR) of each of said set of available channels;
   a signal-to-interference-plus-noise ratio (SINR) of each of said set of available channels; and
   a carrier-to-interference ratio (CIR) of each of said set of available channels.

5. A method for an access terminal to determine an operating channel for downlink communication in a wireless communication network, said method comprising:
   extracting a set of available channels of an access point from a signal broadcast over a licensed channel in a licensed radio frequency spectrum from the access point of said wireless communication network;
   measuring an interference associated with a plurality of said set of available channels at said access terminal;
   transmitting said measured interference for said plurality of said set of available channels to said access point; and
   receiving an allocated channel in an unlicensed radio frequency spectrum from said access point, wherein said interference associated with said allocated channel is favorable for transmission to said access terminal.

6. The method of claim 5 wherein said measuring comprises at least one of:
   measuring a signal-to-noise ratio (SNR) of each of said set of available channels;
   measuring a signal-to-interference-plus-noise ratio (SINR) of each of said set of available channels; and
   measuring a carrier-to-interference ratio (CIR) of each of said set of available channels.

7. An access point of a wireless communication network, said access point comprising:
   a processor;
   a modulator/demodulator (modem) coupled to said processor;
   a transceiver coupled to said processor;
   an antenna array coupled to said transceiver;
   a memory coupled to said processor;

a multichannel selection module stored in said memory, wherein, when executed by said processor, said executing multichannel selection module configures said access point:
- to broadcast over a licensed channel in a licensed radio frequency spectrum, a set of channels available to the access point, into said wireless communication network;
- to receive interference information from a plurality of access terminals, said interference information describing interference for a plurality of channels in said set of available channels;
- to select an operating channel for each of said plurality of access terminals based on an available channel of said set of available channels that has a favorable interference measurement for each of said plurality of access terminals according to said interference information; and
- to allocate said operating channel for downlink communication with each of said plurality of access terminals, wherein, in serving said plurality of access terminals, a plurality of operating channels in an unlicensed radio frequency spectrum are selected.

8. The access point of claim 7 wherein said executing multichannel selection module configures said access point to select said operating channel further based on a service load on said available channel.

9. The access point of claim 7 wherein said executing multichannel selection module configures said access point to select said operating channel further based on a current capacity of a plurality of access points within a shared coverage area servicing at least one of said plurality of access terminals.

10. The access point of claim 7 wherein said interference information comprises at least one of:
- a signal-to-noise ratio (SNR) of each of said set of available channels;
- a signal-to-interference-plus-noise ratio (SINR) of each of said set of available channels; and
- a carrier-to-interference ratio (CIR) of each of said set of available channels.

11. An access terminal of a wireless communication network, said access terminal comprising:
- a processor;
- a modulator/demodulator (modem) coupled to said processor;
- a transceiver coupled to said processor;
- an antenna array coupled to said transceiver;
- a memory coupled to said processor;
- a signal quality analysis module stored in said memory, wherein, when executed by said processor, said executing signal quality analysis module configures said access terminal:
  - to extract a set of available channels of an access point from a signal broadcast over a licensed channel in a licensed radio frequency spectrum from the access point of said wireless communication network;
  - to measure an interference associated with a plurality of said set of available channels at said access terminal;
  - to transmit said measured interference for the plurality of said set of available channels to said access point; and
  - to receive an allocated channel in an unlicensed radio frequency spectrum from said access point, wherein said interference associated with said allocated channel is favorable for transmission to said access terminal.

12. A non-transitory computer readable medium having program code tangibly stored thereon, said program code comprising:
- program code to broadcast over a licensed channel in a licensed radio frequency spectrum, from an access point, a set of channels available to the access point, into a wireless communication network;
- program code to receive interference information from a plurality of access terminals, wherein said interference information describes interference for a plurality of channels in said set of available channels;
- program code to select an operating channel for each of said plurality of access terminals based on an available channel of said set of available channels that has a favorable interference measurement for said each of said plurality of access terminals according to said interference information; and
- program code to allocate said operating channel for downlink communication with said each of said plurality of access terminals, wherein, in serving said plurality of access terminals, a plurality of operating channels in an unlicensed radio frequency spectrum are selected.

13. The non-transitory computer readable medium of claim 12 wherein said program code to select said operating channel is further based on a service load on said available channel.

14. The non-transitory computer readable medium of claim 12 wherein said program code to select said operating channel is further based on a current capacity of a plurality of access points within a shared coverage area servicing at least one of said plurality of access terminals.

15. The non-transitory computer readable medium of claim 12 wherein said interference information comprises at least one of:
- a signal-to-noise ratio (SNR) of each of said set of available channels;
- a signal-to-interference-plus-noise ratio (SINR) of each of said set of available channels; and
- a carrier-to-interference ratio (CIR) of each of said set of available channels.

16. A non-transitory computer readable medium having program code tangibly stored thereon, said program code comprising:
- program code to extract a set of available channels of an access point from a signal broadcast over a licensed channel in a licensed radio frequency channel from the access point of a wireless communication network;
- program code to measure an interference associated with a plurality of channels of said set of available channels at an access terminal;
- program code to transmit said measured interference for the plurality of said set of available channels to said access point; and
- program code to receive an allocated channel in an unlicensed radio frequency spectrum from said access point, wherein said interference associated with said allocated channel is favorable for transmission to said access terminal.

17. A system for dynamically selecting a plurality of channels in a wireless communication network, said system comprising:
- means for broadcasting over a licensed channel in a licensed radio frequency spectrum, from an access point, a set of channels available to the access point, into said wireless communication network;
- means for receiving interference information from a plurality of access terminals, wherein said interference information describes interference for a plurality of channels in said set of available channels;

means for selecting an operating channel for each of said plurality of access terminals based on an available channel of said set of available channels that has a favorable interference measurement for each of said plurality of access terminals according to said interference information; and means for allocating said operating channel for downlink communication with said each of said plurality of access terminals, wherein, in serving said plurality of access terminals, a plurality of operating channels in an unlicensed radio frequency spectrum are selected.

18. The system of claim 17 wherein said means for selecting said operating channel is further based on a service load on said available channel.

19. The system of claim 17 wherein said means for selecting said operating channel is further based on a current capacity of a plurality of access points within a shared coverage area servicing at least one of said plurality of access terminals.

20. The system of claim 17 wherein said interference information comprises at least one of:

a signal-to-noise ratio (SNR) of each of said set of available channels;

a signal-to-interference-plus-noise ratio (SINR) of each of said set of available channels; and a carrier-to-interference ratio (CIR) of each of said set of available channels.

21. A system for an access terminal to determine an operating channel for downlink communication in a wireless communication network, said system comprising:

means for extracting a set of available channels of an access point from a signal broadcast over a licensed channel in a licensed radio frequency spectrum from the access point of said wireless communication network;

means for measuring an interference associated with a plurality of said set of available channels at said access terminal;

means for transmitting said measured interference for the plurality of said set of available channels to said access point; and means for receiving an allocated channel in an unlicensed radio frequency spectrum from said access point, wherein said interference associated with said allocated channel is favorable for transmission to said access terminal.

* * * * *